United States Patent Office 3,470,007
Patented Sept. 30, 1969

3,470,007
STABILIZED LEAD CHROMATE PIGMENTS AND PROCESS FOR MAKING SAME
Howard R. Linton, Scotch Plains, N.J., assignor to E. I. du Pont de Nemours and Company, Wilmington, Del., a corporation of Delaware
No Drawing. Filed Nov. 8, 1967, Ser. No. 681,589
Int. Cl. C09c 1/20, 3/00
U.S. Cl. 106—298                                   14 Claims

ABSTRACT OF THE DISCLOSURE

Lead chromate pigments having improved resistance to chemical attack by alkalis, acids, and sulfides, having increased resistance to discoloration on exposure to light or elevated temperatures, especially when used as colorants for molded plastics, and having decreased susceptibility to mechanical destruction by abrasion, shear or impact, are produced by effectively coating the lead chromate pigment particles with dense, amorphous silica, optionally in combination with alumina, and thereafter depositing on the silica-coated particles a stabilizing agent selected from the group consisting of alkaline earth metal salts of rosin acids and of long-chain fatty acids.

BACKGROUND OF THE INVENTION

Field of the invention

The invention pertains to improvements in the field of coated pigments, especially pigments for use in paints and plastics.

Description of the prior art

Metal salts of rosin acids and of long-chain fatty acids have hitherto been used for the treatment of organic pigments, but their use with lead chromate pigments, particularly in relatively large proportions, has been avoided. The reluctance to consider such products is understandable because of the recognized ability of the readily oxidizable organic acid to react chemically with the lead chromate, the hexavalent chromium of the latter being reduced to the trivalent state and the desirable yellow-to-red color inherent in the original pigment being replaced by a highly undesirable green-to-black color. It has not hitherto been apparent how this chemical reaction between lead chromate pigments and rosin acids or long-chain fatty acid treating agents can be avoided.

U.S. Patent 2,885,366, issued May 5, 1959, to Ralph K. Iler, describes products "comprising a skin of dense, hydrated amorphous silica bound upon a core of another solid material and process of making same," and U.S. Patent 2,913,419, issued Nov. 17, 1959, to Guy B. Alexander, describes "a product composed of a dense skin of amorphous silica, containing aluminum, chemically bound upon a core of another solid material." In my copending U.S. application Ser. No. 555,954, filed June 8, 1966, now U.S. Patent 3,370,971, I have described lead chromate pigments coated with dense, amorphous silica and, optionally, additionally with combined alumina. In my application Ser. No. 681,323, filed concurrently herewith, I have described preferred products of this type prepared by subjecting lead chromate pigments to intense hydraulic shear prior to coating them with silica.

In my above-mentioned Patent No. 3,370,971, it is recognized that such silica or silica-alumina coatings are fragile and are susceptible to rupturing by certain treatments, so that the continuity of the coating on the lead chromate pigment is destroyed. This results in loss of a considerable part of the benefits derived from the silica coating. To avoid this undesirable deterioration of the coated lead chromate pigment the user must carefully select his conditions of processing, and such selection is very frequently costly, impractical or undesirable.

In the normal use, for instance, of pigments for the coloration of such thermoplastic resins as polystyrene and polyethylene, the dry pigment is first mixed with the solid, granular resin, and this mixture is subjected to vigorous stirring until homogeneity is attained. This operation may be performed in a wide variety of equipment, such as a ribbon blender, a Banbury mixer, a Baker-Perkins mixer, or a tumbling drum. In all such operations, which are common in the plastics industry, the rigorous treatment can actually result in the removal, to varying degrees, of the silica or silica-alumina coating from the lead chromate pigment, with resultant deterioration in the chemical, thermal, and light resistance of the pigment. It has not been apparent heretofore how this problem could be solved and the necessity of special precautions in processing avoided.

SUMMARY

Now according to the present invention it has been found that the above-mentioned chemical reduction of chromium in lead chromate pigments can be avoided and improved pigments having excellent color stability can be produced, by first coating pigmentary lead chromate particles, preferably after being subjected to intense hydraulic shear, with dense, amorphous hydrated silica and optionally also with alumina superimposed thereon, and thereafter treating the so-coated pigment with an alkaline earth metal salt of an acid selected from the group consisting of rosin acids and long-chain fatty acids. The alkaline earth salt treatment conveys the benefit of overcoming the inherent fragility of the encapsulating coatings in that it renders the coatings less susceptible to destruction under severely abrasive conditions of subsequent processing in plastics applications. The treated pigments also have improved properties as components of organic paint systems, such improvement being related to the superior wetting and dispersibility of the pigments in organophilic systems and being manifested particularly in the higher gloss of the resulting finishes.

DESCRIPTION OF PREFERRED EMBODIMENTS

In a preferred embodiment of the invention, a slurry of lead chromate pigment is heated in a dilute aqueous solution of sodium silicate, whereupon a continuous silica coating is formed on the pigment particles. Thereafter, an aqueous solution of sodium aluminate is added and heating is continued, whereby alumina is deposited on the silica coating. Alternatively, the initial deposition of the silica coating on the pigment particle may be effected by the addition of dilute sulfuric acid to the suspension of pigment in sodium silicate solution, and this step subsequently followed by the treatment with sodium aluminate solution. The pigment slurry is then rendered slightly alkaline (pH 8–9), and to this is added a separately prepared aqueous rosin soap solution, derived from hydrogenated rosin and sodium hydroxide. To the resulting slurry is then added an aqueous solution of a calcium salt, whereupon the calcium derivative of hydrogenated rosin is precipitated in the presence of the pigment slurry. The pigment is isolated by conventional filtration, washing, drying and pulverizing steps. The steps of drying and grinding may be omitted where desired, and the product may be used as an aqueous paste or slurry in subsequent applications.

The invention will be better understood by reference to the following illustrative examples. The term "parts," as used herein, refers to parts by weight.

Example 1

A slurry of 450 parts of Chrome Yellow pigment (C.I. 77600) in 3,000 parts of water was stirred to uniformity at room temperature. To this was added, with stirring, 60 parts of sodium silicate solution (Du Pont No. 20WW grade, containing 28.4% $SiO_2$ by analysis; $SiO_2/Na_2O$ ratio=3.25). The slurry was then passed once through an homogenizer at 5,000 p.s.i. to thoroughly disperse the pigment, and the residual pigment was recovered from the equipment by flushing with 750 parts of water. The washings were added to the original slurry. A 1,420-part portion of the combined slurry was heated to 90–95° C. over a 30-minute period and the pH adjusted to 9.0–9.5 by addition of sodium hydroxide solution as necessary. The following two solutions were then added simultaneously with stirring at a uniform rate of approximately 3 parts per minute:

(1) 115 parts of sodium silicate solution, as described above, diluted with water to a volume equivalent to 600 parts of water, and
(2) 800 parts of water containing 17.3 parts of sulfuric acid (96%).

Stirring was continued for 15 minutes following completion of the addition, and the pH then adjusted to 8.0–9.0 with sodium hydroxide solution.

A rosin soap solution was separately prepared by dissolving 40 parts of hydrogenated rosin ("Staybelite" resin, manufactured by Hercules Powder Company) in 360 parts of water containing 5.4 parts of sodium hydroxide. To effect the desired solution, the mixture was heated approximately to the boil with stirring and maintained at this temperature until all of the rosin was dissolved and a solution free of suspended solids obtained. The clear rosin soap solution was added to the pigment slurry, stirring was continued for approximately 15 minutes, and the rosinate was then precipitated by adding, over approximately 15 minutes, a solution made by dissolving 15.9 parts of anhydrous calcium chloride in 100 parts of water. The product was isolated by filtering, washing free of sulfate and drying at a temperature of approximately 80° C. The dried product was pulverized in a "Mikro-Pulverizer."

Evaluation of the product in a conventional printing ink vehicle showed it to be approximately equal in strength to the corresponding pigment prepared without the rosin treatment, when adjusted to the same lead chromate content. Enamels were prepared by dispersing this pigment, both by ball milling and by sand milling, in a melamine-modified alkyd vehicle. The enamel prepared from the pigment which had received the calcium rosinate treatment was markedly superior in gloss to that from the counterpart made in similar manner but without the addition of the rosin. Gloss comparisons were made at 20°, following the ASTM Method D523–62T, as described in "1966 Book of ASTM Standards," part 21, pages 105–108, American Society for Testing and Materials, Philadelphia, Pa.

The susceptibility of the pigment to degradation by dry grinding with solid resin polymer was evaluated in the laboratory in two ways. In each case a mixture containing 1 part of pulverized pigment and 100 parts of dry polystyrene granules was placed in a closed can of such size that the charge occupied approximately ¼ of the volume thereof. The closed can and contents were then subjected to mechanical action by (1) rolling for 10 minutes on mechanical rollers at 138 r.p.m., or by (2) shaking vigorously for 2 minutes in a paint shaker (such as the "Red Devil" paint conditioner, manufactured by Red Devil Tools, Irvington, N.J.). The type of mechanical action is different in the two cases, the test in the paint shaker being much more severe. Following the specified mixing, a portion of the mixture was tested by injection molding at 320° C. For purposes of reference, the test sample was compared with the corresponding uncoated lead chromate pigment used as the base in this example and also with the corresponding silica-coated pigment containing no calcium rosinate. The degree of degradation undergone by the pigment during the dry mixing operation was determined by noting the color difference between the chips extruded at 200° C. (where no appreciable detectable color change is noted, presumably because there has been no appreciable reaction between the pigment and resin) and that molded at 320° C., at which temperature marked interaction between the lead chromate pigment and resin will occur, unless the surface of the lead chromate has been protected by suitable coating such as silica. The results were as follows:

| Sample | Grinding Procedure | Heat Stability at 320° C. |
|---|---|---|
| Base pigment without silica treatment. | Can rolling | Poor. |
| Do. | "Red Devil" mixing | Do. |
| Base pigment with silica coating, but without rosinate treatment. | Can rolling | Fair to good. |
| Do. | "Red Devil" mixing | Poor. |
| Product of Example 1 | Can rolling | Excellent. |
| Do. | "Red Devil" mixing | Good. |

These results clearly show the marked beneficial effect of the calcium rosinate treatment superimposed on the silica treatment.

Example 2

This example illustrates a combined silica-alumina treatment in contrast to the silica alone of Example 1.

To a uniform slurry of 150 parts of Molybdate Orange (C.I. 77605) in 1,000 parts of water was added 10 parts of sodium silicate solution (containing 28.4% $SiO_2$; $SiO_2/Na_2O$ ratio=3.25). The slurry was passed once through an homogenizer at 5,000 p.s.i. to insure thorough dispersion. It was then heated to 90° C., and the pH (normal 8.5±0.5) adjusted to 9.0–9.5 by the addition of aqueous 5% sodium hydroxide solution as necessary. The following two solutions were introduced simultaneously with stirring at a uniform rate:

(1) 125 parts of sodium silicate solution, as described above, diluted with water to a volume equivalent to 600 parts of water, added over a period of 4 hours, and
(2) 17.3 parts of sulfuric acid (96%) diluted with water to a volume equivalent to 800 parts of water, added over 5 hours.

After addition was complete, the slurry was heated for 15 minutes more and the pH adjusted to 9.0±0.2 with dilute sodium hydroxide. To this was then added dropwise with stirring an aqueous solution of 8.84 parts of sodium aluminate (equivalent to 2.2 parts of $Al_2O_3$). The stirring was continued for an additional 30 minutes at 90° C. To the slurry was then added a rosin soap solution prepared as in Example 1 from 40 parts of hydrogenated rosin, 5.4 parts of sodium hydroxide, and 360 parts of water. Following a 15-minute stirring period, the rosin soap was precipitated by the addition in 15 minutes of a solution of 15.9 parts of anhydrous calcium chloride in 100 parts of water. After an additional 15-minute stir, the product was isolated as described in Example 1. Yield obtained: 221 parts.

The product obtained, when dispersed in polystyrene on a two-roll mill (0.016" clearance) and then injection molded, showed excellent color stability at 320° C., being substantially as good as its behavior on molding at 200° C. Likewise, preliminary can rolling for 10 minutes or "Red Devil" mixing for 5 minutes of the dry pigment with solid granular resin did not significantly affect the heat stability on subsequent injection molding. When the pigment was dispersed in an alkyd enamel vehicle, the resulting paint coating showed excellent gloss (60–70 at 20°).

By contrast, the corresponding pigment prepared in the identical manner, but from which the rosinate treatment was omitted, showed marked deterioration in heat stability on injection molding, after preliminary mixing in dry form with polystyrene resin either by can rolling or by "Red Devil" shaking. However, the heat stability was satisfactory at both temperatures when the initial dispersion of pigment in polystyrene was effected by two-roll milling. An enamel prepared from this pigment showed very poor gloss.

Example 3

This example shows the use of aluminum sulfate rather than the sodium aluminate of Example 2 to provide the alumina coating.

The process of Example 2 was repeated, except that basic lead chromate (C.I. 77601) was substituted for the Molybdate Orange. After completion of the simultaneous addition of sodium silicate solution and dilute sulfuric acid, the slurry was heated at 90° C. for 15 minutes, following which a solution of 20 parts of aluminum sulfate ($Al_2(SO_4)_3 \cdot 15H_2O$) dissolved in 100 parts of water was added in 15 minutes. The slurry was stirred at 90° C. for an additional 30 minutes, following which is was successively treated with rosin soap solution and calcium chloride solution exactly as in the manner prescribed in Example 2. The product was isolated by conventional means.

When tested in polystyrene by injection molding and in alkyd enamels as already described, the pigment obtained showed advantages in heat stability and gloss, respectively, by comparison with the corresponding control from which the rosin treatment was omitted.

Example 4

The procedure of Example 2 was repeated, except that lead sulfochromate (C.I. 77603) was substituted for the Molybdate Orange. The resulting pigment showed similar advantages in heat stability on injection molding in polystyrene and in gloss in alkyd enamel, by comparison with the corresponding control from which the rosin treatment was omitted.

Example 5

This example shows the effect of varying the amount of calcium rosinate in the treatment of the coated lead chromate pigment.

The procedure of Example 2 was repeated to the point following the coating with silica and adjustment of the pH of the slurry to 9.0±0.2 with dilute sodium hydroxide. The slurry was then divided into three 850-part portions, each containing 62 parts of silica-coated pigment on a dry basis. The individual portions, labeled A, B, and C, were then treated as in Example 2 with rosin soap solutions and these in turn precipitated with calcium chloride solution, except that the quantities of the respective ingredients used were as follows:

| Ingredient | A (Parts) | B (Parts) | C (Parts) |
|---|---|---|---|
| For Rosin Soap Soln.: | | | |
| Hydrogenated Rosin | 4 | 8 | 12 |
| Water | 36 | 72 | 108 |
| NaOH | 0.54 | 1.08 | 1.62 |
| Calcium Chloride, Anhydrous | 1.58 | 3.16 | 4.74 |
| Water (for solution of $CaCl_2$) | 100 | 100 | 100 |
| Yield | 64.6 | 68.4 | 72.2 |
| Calcium Rosinate Content (Calculated), percent | 6 | 11.4 | 16.2 |

The products were isolated in a conventional manner in the yields indicated.

All of the products showed improved resistance to abrasion, as determined by the dry grinding test and injection molding in polystyrene already described. By extending the dry grinding time to longer periods, it was readily demonstrated that Sample C was most resistant to deterioration, while Sample A was least. These results show that the resistance to deterioration on dry grinding is improved with increasing content of calcium rosinate.

Example 6

This example compares the treatment of the silica-coated lead chromate pigment with calcium rosinate, as already described, with alternate methods of flocculating and coating the pigment to improve heat stability on injection molding in plastics and gloss in paint systems.

To a uniform slurry of 200 parts of Chrome Yellow (C.I. 77600) in 1,330 parts of water, was added 26.7 parts of a sodium silicate solution (containing 28.4% $SiO_2$ by analysis; $SiO_2/Na_2O$ ratio $=3.25$), and the resulting slurry was homogenized at 8000 p.s.i. The temperature of the slurry was adjusted to 90° C. and the pH to 9.0±0.5. To the stirred slurry at 90° C. were added simultaneously the following solutions:

(1) 153 parts of sodium silicate solution, as described above, diluted to a volume corresponding to 800 parts of water, over a 4-hour period, and (2) 23.0 parts of sulfuric acid (96%), diluted with water to a volume corresponding to 1,070 parts of water, over a period of 5 hours.

After the addition was complete, the slurry was stirred for an additional 15 minutes, the pH adjusted to 9.0±0.5, and 800-part aliquots (corresponding to 40 parts of dry pigment) were taken for the following experiments.

(A) To an 800-part aliquot of the silica-coated Chrome Yellow slurry was added a rosin soap solution prepared in the manner already described from 3.0 parts of hydrogenated rosin, 0.5 part of sodium hydroxide, and 35 parts of water. Following the stirring period, the rosin soap solution was precipitated in 15 minutes at 90° C. by the addition of a solution of 1.2 parts of calcium chloride in 35 parts of water.

(B) To an 800-part aliquot of the silica-coated Chrome Yellow slurry was added a solution of sodium stearate, prepared by dissolving 6.2 parts of stearic acid, 0.5 part of sodium hydroxide and 300 parts of water. To the stirred reaction mixture at 90° C. was added over 15 minutes a solution made by dissolving 1.2 parts of anhydrous calcium chloride, in 35 parts of water.

(C) Example 6(B) was repeated, except that 2.3 parts of strontium nitrate was substituted for the calcium chloride of the preceding example.

(D) Example 6(A) was repeated, except that 2.3 parts of strontium nitrate was substituted for the calcium chloride used in the earlier example.

All of the foregoing products were isolated in conventional manner by filtering, washing sulfate-free, and drying, following which heat stability in polystyrene at 320° C. and gloss when dispersed in a typical alkyd system were determined, as already described. In the following table an arbitrary numerical rating has been assigned to characterize the color stability in plastics, following dry grinding of the pigment with polystyrene and subsequent injection molding. A numerical rating of 10 indicates no detectable color change on comparison of the material injection molded at 320° C. with the same material molded at 200° C. By contrast, a rating of 0 denotes complete loss of desired color. Although it is difficult to associate a particular numerical rating in this arbitrary test with satisfactory performance in practical application, nevertheless it is safe to assert that any product showing a numerical rating of 4 or higher has been significantly improved. The gloss readings reported are those measured at 20° by the ASTM Method D523-62T. A gloss rating of 65 at 20° is considered satisfactory for automobile enamels and any significantly below is considered unacceptable.

| Number | Flocculant | Heat Stability at 320° C. | 20° Gloss |
|---|---|---|---|
| A | Calcium Rosinate | 10 | 68.0 |
| B | Calcium Stearate | 8 | 49.0 |
| C | Strontium Stearate | 9 | 39.5 |
| D | Strontium Rosinate | 8 | 64.0 |

From the foregoing results, it is clear that all four products show sufficient heat stability at 320° C. to be considered satisfactory for injection molding of polystyrene. However, only the calcium rosinate (A) and strontium rosinate (D) products show satisfactory gloss to be considered of interest as pigments for use in automotive enamels. It is noteworthy that the calcium rosinate product is superior in both respects.

Example 7

This example shows the effect of substituting rosinates of other metals for the calcium salt of hydrogenated rosin. Also it compares metal rosinates derived from different typical rosins.

The procedure followed that of Example 6(A), except that, where indicated, the specified rosin was substituted for the hydrogenated rosin, and where a metal derivative other than that of calcium was prepared, a corresponding solution of the appropriate metal salt in stoichiometrically equivalent quantity was used.

| Number | Rosin Component | Metal Salt Precipitated | Heat Stability at 320° C. |
|---|---|---|---|
| A | Hydrogenated Rosin | Barium | 9 |
| B | do | Magnesium | 3 |
| C | do | Cadmium | 4 |
| E | do | Copper | 2 |
| F | do | Nickel | 4 |
| G | do | Aluminum | 3 |
| H | None (Untreated Control) | None (Untreated Control) | 2 |
| I | K-Wood Rosin | Calcium | 4 |
| J | do | Strontium | 5 |
| K | do | Barium | 4 |
| L | M-Gum Rosin | Calcium | 4 |
| M | do | Strontium | 6 |
| N | do | Barium | 4 |
| O | Tall Oil | Calcium | 5 |
| P | do | Strontium | 5 |
| Q | do | Barium | 3 |

The foregoing results, coupled with those given in Examples 6-A and 6-D, demonstrate the superiority of the products containing the alkaline earth metal (calcium, strontium and barium) derivatives of hydrogenated rosin. Other metal derivatives of the same hydrogenated rosin do not confer the same degree of improvement, if any, on the pigment. Likewise, the alkaline earth metal derivatives of other rosins (K-wood, M-gum, and tall oil, the last being essentially a mixture of rosin and fatty acids) are not as effective as the corresponding derivatives of hydrogenated rosin.

Example 8

This example shows the effect of substituting long-chain fatty acids for the rosins used in the preceding examples. The procedure followed was that of Example 6(B), except that, where indicated, an appropriate salt of strontium or barium was substituted for that of calcium in the earlier example, and the fatty acid specified was used in place of the stearic of Example 6(B). All such substitutions were made in stoichiometrically equivalent amounts. The results follow:

| Number | Fatty Acid | Metal Salt Precipitated | Heat Stability at 320° C. |
|---|---|---|---|
| A | Myristic Acid | Calcium | 7 |
| B | do | Strontium | 7 |
| C | do | Barium | 7 |
| D | Palmitic Acid | Calcium | 6 |
| E | do | Strontium | 7 |
| F | do | Barium | 5 |
| G | Oleic Acid | Calcium | 4 |
| H | do | Strontium | 5 |
| I | do | Barium | 4 |

These results indicate that the alkaline earth metal derivatives of long-chain fatty acids are effective to a significant degree in conferring the desired improvement on the coated pigment. The derivatives of myristic and palmitic acids are, in fact, superior to their counterparts derived from K-wood rosin and M-gum rosin, respectively. They are, however, not fully equal to the preferred derivatives of hydrogenated rosin.

Lead chromate pigments have been known and widely used for many years, and are available in a broad range of shades. Of the preferred lead chromate pigments for treatment in accordance with this invention, there is, on the one hand, the very green shade "Primrose Yellow" in rhombic crystal form. A relatively pure lead chromate in monoclinic crystal form is much redder and is commonly known as "Medium Yellow." Intermediate shades are available in solid solutions of lead chromate and lead sulfate usually in monoclinic form. At the other extreme is a series of solid solutions of lead chromate, lead sulfate and lead molybdate in tetragonal crystal form which are oranges or even yellowish reds commonly known as "Molybdate Oranges" or "Molybdate Reds."

Three methods of applying the silica coating are illustrated in the examples of the above-mentioned patent No. 3,370,971, viz., (1) simultaneous but separate addition of a soluble silicate and a mineral acid, (2) addition of a silicic acid solution freshly prepared by deionizing a sodium silicate solution with a cation-exchange resin, and (3) addition of sodium silicate solution to the pigment slurry, followed by addition of sulfuric acid. Details of said methods disclosed in application Ser. No. 555,954 are incorporated herein by reference.

There are certain critical conditions which must be observed during the treatment by any of these three methods. To obtain the desired dense silica coatings on the pigment particles, the pH of the slurry at the point of addition of the silica-forming ingredients to the mixture must be at least above pH 6.0 and preferably in the range of 9.0 to 9.5. Furthermore, the temperature at this same point must be at least above 60° C. and preferably above 75° C. In many cases it is preferred that the temperature be about 90° C. When the pH is allowed to go below about 6.0 or the temperature significantly below 60° C., there is a pronounced tendency for the silica to precipitate in an undesired porous, gel-like structure.

The above-mentioned methods all result in the deposition of at least the major part of the silica as the desired amorphous continuous film on the surface of the pigment particles in the slurry. In all of these methods it is assumed that the pigment particles are well dispersed in sufficient water to give a fluid, easily-stirrable starting slurry, and preferably have been deagglomerated by intense shear as described in my copending application Ser. No. 681,323, filed concurrently herewith. Such a slurry can result directly from the preparation of the pigment as described followed by suitable washing, or it can be a reconstituted slurry made either by redispersing a washed filter cake or by dispersing a dry pigment in water. A convenient starting slurry can contain approximately 25% pigment, the balance being water, but this concentration is not critical. It is desirable that the initial pigment slurry be essentially free of water soluble raw material excesses, such as are normally washed out in the manufacturing filtration step; otherwise, they might complicate the subsequent pigment coating step, as would be the case were excess lead ion to react with the added sodium silicate and precipitate lead silicate, thus interfering with the attainment of the desired continuous silica coating on the pigment.

It is common for lead chromate pigments to be finished slightly on the acid side, and when such pigments are reconstituted to form the starting slurry an alkaline treatment is necessary to achieve the desired pH at the point of subsequent treatment. Such an alkaline treatment can employ any convenient alkali, such as ammonium hydroxide or sodium hydroxide, unless the use of a strong alkali such as sodium hydroxide is precluded by the sensitivity thereto of the lead chromate pigment to be coated. A still more convenient method is to add a small amount of a sodium silicate solution; this achieves the desired alkalinity and tends to improve the dispersion of the pigment particles in the slurry. In such a treatment, care should be exercised not to exceed a pH of about 11.0 lest the lead chromate be somewhat solubilized. The sodium silicate solution used in such an addition as well as in the subsequent treatment steps is a commercial product widely available with a $SiO_2/Na_2O$ ratio of about 3.25 and a $SiO_2$ content of 28.4%. Such a product is convenient but not essential, and other sodium silicate solutions can be used as available. It is desirable, however, that the sodium ion content ($Na^+$) be kept low, since a high sodium ion content tends to cause gelation of silicic acid.

The above-mentioned methods of forming the silica layer on the surface of the lead chromate pigment particles have one feature in common, viz. that the silica is added as "active silica." When sodium silicate is acidified, silicic acid is formed, probably initially as orthosilicic acid, $Si(OH)_4$. However, this product tends to polymerize by the reaction of two silanol groups

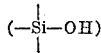

to form a siloxane group

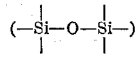

Under acidic conditions, this polymerization proceeds rapidly until a predominant proportion of the silanol groups present have been used up in the formation of siloxane bonds. The polymer thus formed has a high molecular weight and is defined as "inactive." Under the conditions of moderate alkalinity used in the examples above, there is a low degree of polymerization wherein the condensation between silanol groups has proceeded to only a limited extent leaving the silica in an "active" form which readily deposits on the surface of the lead chromate particles present. It is not intended to imply that there is no polymerization nor that the process of polymerization is completely inhibited but, under the conditions specified, the silica is in a state of low polymerization and, thus "active," for a sufficient time to bring about deposition in the dense, amorphous form on the surface of the lead chromate pigment particles. This term "active silica" has been more precisely defined elsewhere (see Rule U.S. Patent 2,577,484 for instance), but the conditions specified above are adequate for the purposes of this invention.

The quantity of silica to be applied in the pigment treatment can be varied over a considerable range depending on the intended end use of the pigment. For use in extruded hot thermoplastic resins where relatively high temperatures (200–300° C.) are encountered, higher amounts, from 15 to 32% of silica, are desirable. There seems to be no great advantage in exceeding about 32%, but amounts up to about 40% of the final pigment can be used with some advantage in resistance to the heat treatment, but with some loss in color properties. Amounts less than 15% show a noticeable improvement over the untreated product but may lack the desired heat resistance. For other uses, however, such products with lower silica have real value, notably for resistance of coating compositions made therefrom to chemical treatment and to exposure to light. In such applications, as little as 2% of dense amorphous silica coatings on lead chromate pigments show real improvement over the untreated counterparts. Thus, for purposes of this invention, in its broadest aspects, the dense amorphous silica coating should be in the range of about 2% to 40% by weight of the final pigment. When alumina is also present, the quantity of $Al_2O_3$ can be varied from 0.25% to 2% by weight of the final pigment.

Although the examples have shown the precipitation of the calcium rosinate, for example, in the presence of the wet slurry of coated lead chromate pigment, it should be understood that the agent may be introduced by other means. Thus, for example, it may be added as a separately prepared slurry or in the dry, powdered form. Best results are obtained by precipitation in situ, and this procedure is preferred. The formation of the metal rosinate is most conveniently carried out at a pH of 8–10. At lower pH, there is danger that some free rosin may be prematurely precipitated from the rosin soap solution; at a higher pH, the coating of silica or silica-alumina may be chemically attacked. The preferred temperature for this operation is in the range of 70–90° C., although minor deviations below or above are permissible. At temperatures significantly below 70° C., the rosin soap solution may show a tendency to precipitate, while at temperatures above 90° C., foaming may be encountered. The rate of addition of the cation solution can be varied significantly; however, it should not be added all at once, as this may result in local zone reaction, such as salting out of the sodium rosinate and incomplete conversion thereof to the desired metal salt.

The amount of treating agent, such as calcium rosinate, may be varied over wide limits. As little as 2% by weight of the uncoated lead chromate pigment is of value. As the amount is increased, the sensitivity of the silica or silica-alumina coating to destruction on dry grinding with resin is correspondingly decreased. Amounts up to 30% are useful, with the preferred range being 5–15% for the alkaline earth rosinates, and 2–10% for the alkaline earth fatty acid salts. Larger amounts can be used, but they confer no added advantage and, since they further extend the pigment and thereby decrease its flexibility in subsequent formulation, they are preferably avoided.

In the examples the tests involving plastics applications have been restricted to polystyrene. The advantages of this invention are applicable also to other plastics, and are particularly evident in those cases where it is customary to premix the dry resin polymer in granular form with the pigment to insure uniformity prior to fluxing and injection molding. Thus, for example, the advantages are evident when the pigment is used for the coloration of polyethylene, polypropylene, and nylon. Likewise, the improvements inherent in the pigments of this invention are readily apparent when they are used for coloring, inter alia, the following additional plastics:

"Delrin," acetal resin
"Dacron," polyester resin
"Tedlar," polyvinylfluoride resin
"Kralastic," ABS high impact resin.

By elimination of previously recognized deficiences of lead chromate pigments, the present invention makes possible the more extensive use of such pigments in various industries, such as paint, printing ink, plastics, and floor covering, where their previous utility was restricted.

What is claimed is:
1. A pigment containing lead chromate having decreased susceptibility to mechanical destruction by abrasion sheer or impact, said pigment consisting essentially of pigment particles comprising lead chromate, said particles having deposited on the surface thereof about from 2 to 40% by weight, based on the coated product weight, of dense, amorphous silica as a substantially continuous film, and having deposited upon the coated pigment from about 2% to about 30% by weight, based on the coated product weight of an alkaline earth metal salt of an acid selected from the group consisting of rosin acids and long-chain fatty acids.

2. A composition of claim 1 in which the lead chromate is substantially pure monoclinic lead chromate.

3. A composition of claim 1 in which the lead chromate is a solid solution of lead chromate, lead sulfate and lead molybdate.

4. A composition of claim 1 in which the lead chromate is a solid solution of lead chromate and lead sulfate, in monoclinic form.

5. A composition of claim 1 in which the silica content is about 15 to 35% by weight, based upon the pigment plus silica content.

6. A composition of claim 1 in which the acid of the alkaline earth metal salt is a hydrogenated rosin acid.

7. A composition of claim 1 in which the metal of the alkaline earth metal salt is calcium.

8. A composition of claim 1 in which the alkaline earth metal salt is a calcium salt of a hydrogenated rosin acid.

9. A composition of claim 1 in which the proportion of deposited alkaline earth metal salt is about from 2 to 30% by weight, based on the lead chromate pigment weight.

10. A composition of claim 1 in which there is deposited upon the silica-coated lead chromate pigment particles up to about 2% of their weight of alumina.

11. A process for producing a pigment of claim 1 comprising in order:
 (a) simultaneously adding to an aqueous dispersion of said pigment maintained at pH of at least 6, a soluble silicate and a mineral acid, thereby coating said pigment with a film of dense, amorphous silica;
 (b) adjusting the pH of said dispersion of said coated pigment to between about 8 and about 10;
 (c) adding to said dispersion a solution of acids selected from the group consisting of rosin acids and long-chain fatty acids; and
 (d) adding to said dispersion a solution of soluble alkaline earth metal salt to precipitate said earth metal derivative on said pigment.

12. A process of claim 11 in which there is deposited upon the silica-coated lead chromate pigment particles up to about 2% of their weight of alumina prior to deposition of the alkaline earth metal salt thereon.

13. A process of claim 11 in which the alkaline earth metal salt is a calcium salt of a hydrogenated rosin acid.

14. A process of claim 11 in which the proportion of deposited alkaline earth metal salt is about from 2 to 30% by weight, based on the lead chromate pigment weight.

References Cited

UNITED STATES PATENTS

| | | |
|---|---|---|
| 2,113,539 | 4/1938 | Meister. |
| 2,237,104 | 4/1941 | Livingston _____ 106—298 |
| 2,296,638 | 9/1942 | Hanahan _____ 106—298 |
| 2,885,366 | 5/1959 | Iler _____ 252—313 |
| 2,987,412 | 6/1961 | Csonka. |
| 3,025,179 | 3/1962 | Holbein. |

OTHER REFERENCES

Perry: Chemical Engineer's Handbook (4th ed.), McGraw-Hill, N.Y. (1963), p. 8–41.

MORRIS LIEBMAN, Primary Examiner

H. H. FLETCHER, Assistant Examiner

U.S. Cl. X.R.

106—308; 260—37, 40, 41, 41.5